United States Patent [19]
Biondi et al.

[11] Patent Number: 6,149,378
[45] Date of Patent: Nov. 21, 2000

[54] METHOD AND UNIT FOR FORMING GROUP OF PRODUCTS

[75] Inventors: Andrea Biondi, Bologna; Fiorenzo Draghetti, Medicina, both of Italy

[73] Assignee: G.D Societa' per Azioni, Bologna, Italy

[21] Appl. No.: 08/965,561

[22] Filed: Nov. 6, 1997

[30] Foreign Application Priority Data

Nov. 11, 1996 [IT] Italy ................................. BO96A0574

[51] Int. Cl.⁷ .................................................. B65G 57/30
[52] U.S. Cl. ................................. 414/795.3; 414/795.1; 198/467.1
[58] Field of Search .............................. 414/795.1, 795.3; 198/467.1

[56] References Cited

U.S. PATENT DOCUMENTS

| | | | |
|---|---|---|---|
| 2,854,125 | 9/1958 | Johnson | 198/104 |
| 3,712,487 | 1/1973 | Eberle | 414/795.1 |
| 3,785,473 | 1/1974 | Cook | 198/333 |
| 4,314,785 | 2/1982 | LaFleur et al. | 414/795.1 |
| 4,361,082 | 11/1982 | Haas et al. | 414/795.1 |
| 4,378,938 | 4/1983 | Staniszewski | 414/795.1 |
| 4,549,645 | 10/1985 | Applegate | 198/408 |
| 4,760,910 | 8/1988 | Suzuki et al. | 198/412 |
| 4,957,409 | 9/1990 | Fukao et al. | 414/795.1 |
| 5,076,416 | 12/1991 | Spatafora et al. | 198/407 |
| 5,765,675 | 6/1998 | Draghetti et al. | 198/408 |
| 6,073,749 | 6/2000 | Biondi et al. | 198/408 |

FOREIGN PATENT DOCUMENTS

0148355  7/1985  European Pat. Off.
9012745  11/1990  WIPO.

Primary Examiner—Christopher P. Ellis
Assistant Examiner—Joe Dillon, Jr.
Attorney, Agent, or Firm—Ladas & Parry

[57] ABSTRACT

A method and unit for forming groups of products, whereby an orderly first succession of products is fed to an input of a conveying path along which a screw conveyor, rotating continuously about a respective axis and having a given number of variable-pitch threads, converts the first succession into an orderly second succession of groups as the products are fed along the conveying path.

20 Claims, 7 Drawing Sheets

METHOD AND UNIT FOR FORMING GROUP OF PRODUCTS

BACKGROUND OF THE INVENTION

The present invention relates to a method of forming groups of products.

The present invention may be used to advantage for forming groups of packets of cigarettes as the packets are transferred from the output of a cellophaning machine to the input of a cartoning machine, to which the following description refers purely by way of example.

On cigarette packing systems comprising a cellophaning machine connected in series with a cartoning machine, the packets of cigarettes are fed from the output of the cellophaning machine to the input of the cartoning machine via a unit for forming the packets of cigarettes into groups, and which comprises a conveying device for feeding the packets along a given path, and a compacting device located along the path and for compacting the packets into groups.

The compacting devices normally comprise either an element movable in the same direction as the packets, and which provides for compacting the packets by accelerating the last packet in each group, or a stop element for compacting the packets by decelerating or even arresting the first packet in each group. Whichever the case, once formed, the groups are fed by the conveying device to a reciprocating unloading device located at the end of the conveying device and for feeding the groups in steps to the input of the cartoning machine.

In the event the packets are arranged differently in the groups as compared with the traveling arrangement of the packets, the group forming unit also comprises an orienting device, which cooperates with the conveying device to change the orientation of the packets by turning the packets about a given axis of orientation, i.e. rotating each packet 90° about a respective axis of orientation normally defined even by the longitudinal axis of the packet.

Forming the packets into groups as described above involves several drawbacks, mainly on account of the numerous devices required to form each group of packets, which not only complicates the design and increases the cost of the forming unit, but also makes the unit relatively unreliable and expensive to maintain.

SUMMARY OF THE INVENTION

It is an object of the present invention to provide a straightforward, low-cost method of forming groups of products, designed to overcome the aforementioned drawbacks.

According to the present invention, there is provided a method of forming groups of products, each group comprising a given number of products, and the method being characterized by comprising the steps of feeding an orderly first succession of products to an input of a given conveying path; and feeding the products in the first succession to an output of said path by means of a variable-pitch conveyor, so that, as the products are fed along said path, the first succession is converted into an orderly second succession of said groups of products.

The present invention also relates to a unit for forming groups of products.

According to the present invention, there is provided a unit for forming groups of products, each group comprising a given number of products, and the unit being characterized by comprising supply means for feeding an orderly first

2 succession of products to an input of a given conveying path; and variable-pitch conveying means for feeding the products in the first succession to an output of said path, so that, as the products are fed along said path, said first succession is converted, in use, into an orderly second succession of said groups of products.

BRIEF DESCRIPTION OF THE DRAWINGS

A number of non-limiting embodiments of the present invention will be described by way of example with reference to the accompanying drawings, in which.

DETAILED DESCRIPTION OF THE INVENTION

Figure 1:
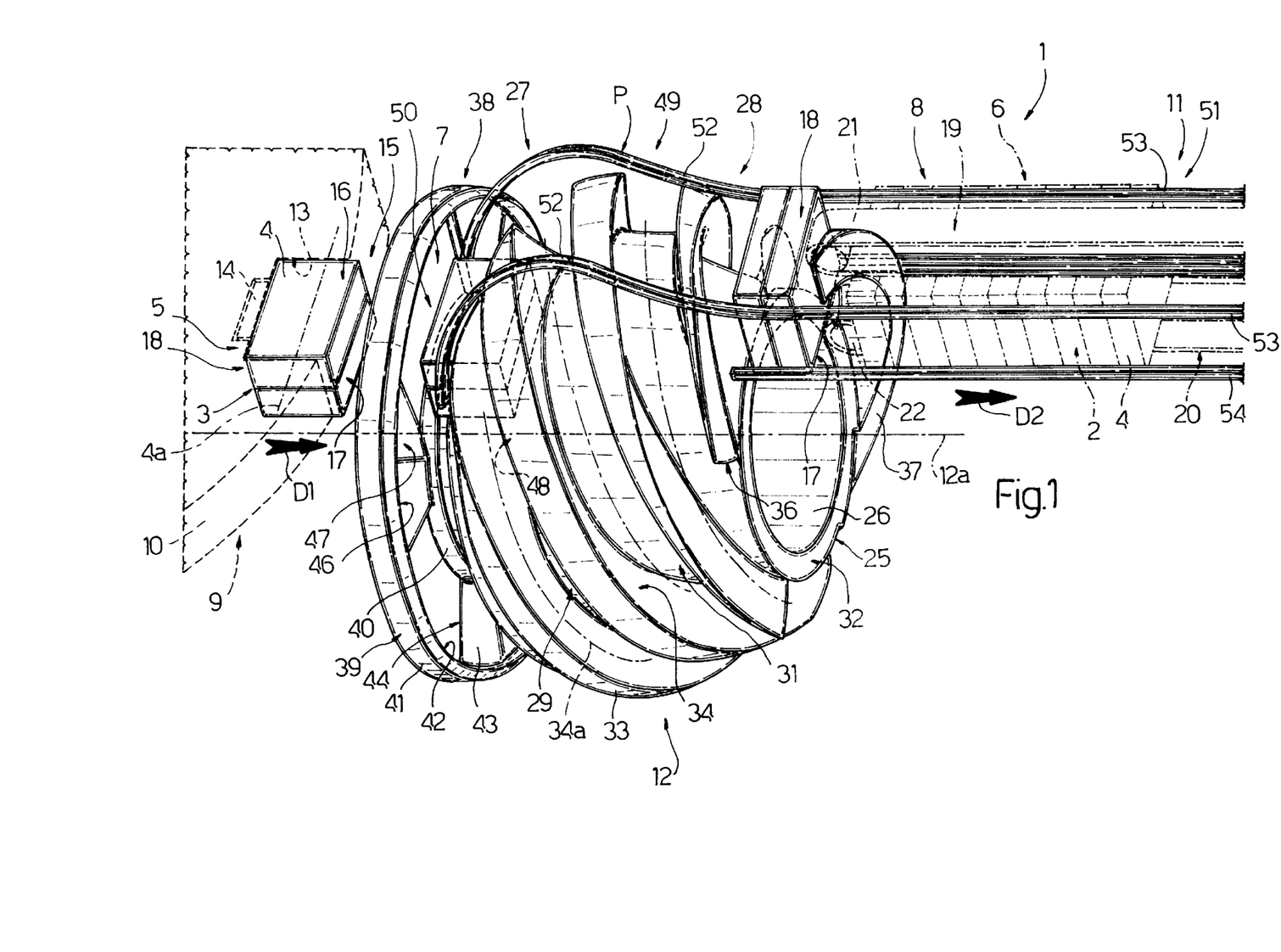
FIG. 1 shows a schematic view in perspective, with parts removed for clarity, of a first preferred embodiment of the forming unit according to the present invention.
Figure 2:
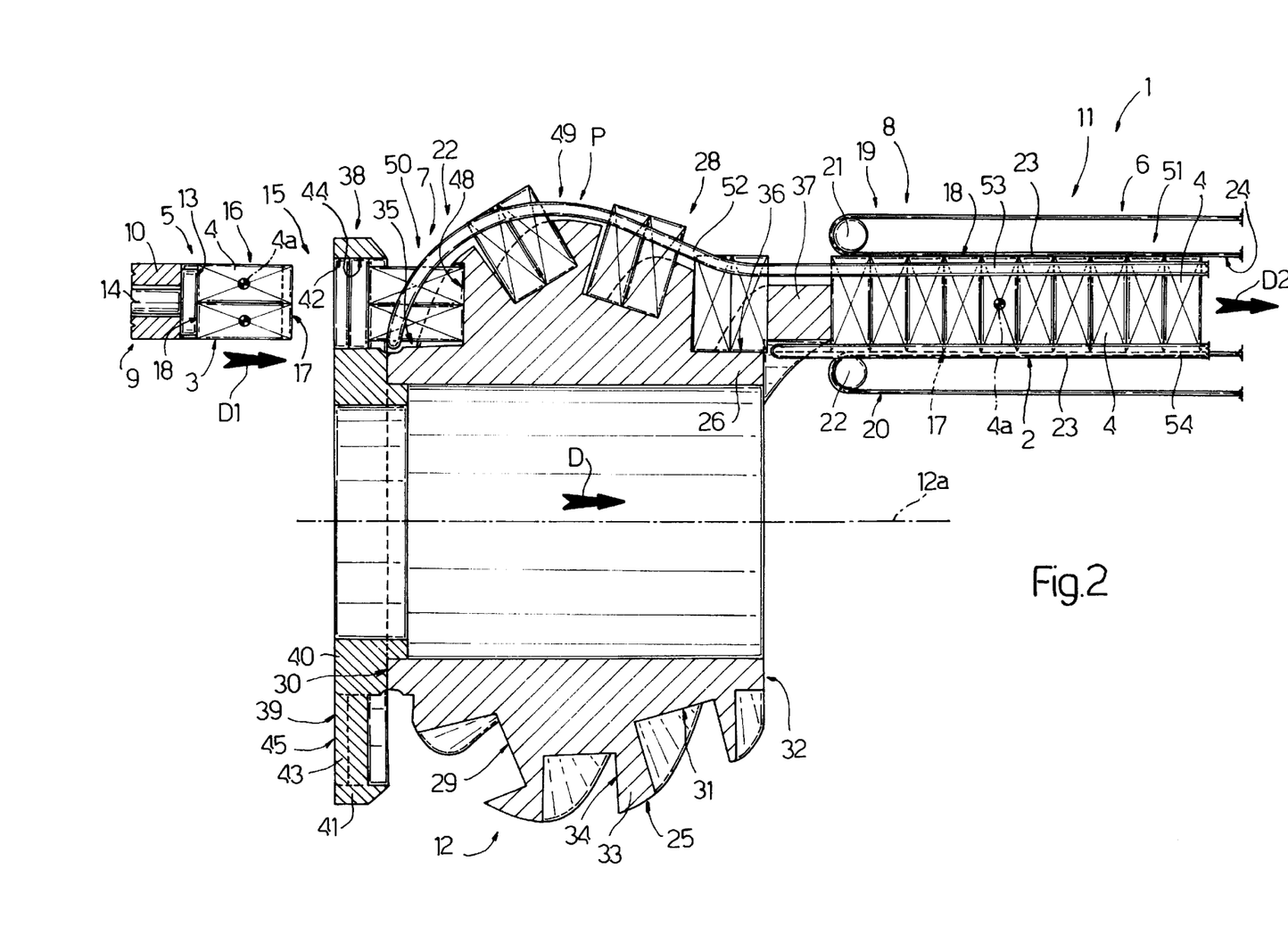
FIG. 2 shows a longitudinal section of the FIG. 1 unit.

Number 1 in FIGS. 1 and 2 indicates a unit for forming groups 2, each containing a given N number of products 3 defined, in the FIG. 1 embodiment, by at least one packet 4 of cigarettes.

Unit 1 provides for converting an orderly succession 5 of products 3 into an orderly succession 6 of groups 2 by feeding products 3 from an input 7 of a given conveying path P to an output 8 of path P, and comprises an input conveyor 9 for feeding succession 5 to input 7 and in turn comprising an output conveyor wheel 10 of a known cellophaning machine (not shown). Unit 1 also comprises an output conveyor 11 located on a level with conveyor 9, and for receiving groups 2 substantially at output 8, and feeding succession 6 of groups 2 to a known cartoning machine (not shown); and a transfer device 12 extending along conveying path P, interposed between conveyors 9 and 11, and for forming groups 2 by transferring products 3 from input 7 to output 8, and for imparting to products 3 a movement comprising both a horizontal component for transferring products 3 from conveyor 9 to conveyor 11 in a given traveling direction D, and a 90° rotation about the longitudinal axis of products 3 perpendicular to the FIG. 2 plane.

In the FIGS. 1 and 2 embodiment, each product 3 is defined by two packets 4 placed one on top of the other, and group 2 comprises ten packets 4 positioned side by side on edge.

Wheel 10 comprises a number of peripheral pockets 13, each for housing and retaining at least a respective packet 4 laid flat, and each comprising a pusher 14 movable to and from an extracted position to unload respective packet 4 in a direction D1 at a transfer station 15 located between wheel 10 and transfer device 12. In the embodiment shown, direction D1 is parallel to direction D and substantially radial with respect to wheel 10, and each pocket 13 houses two packets 4 laid flat one on top of the other, i.e. with a large lateral surface 16 substantially perpendicular to the axis of rotation (not shown) of wheel 10 and parallel to direction D1, with a small lateral surface 17 crosswise to surface 16 and facing radially outwards of wheel 10, and with a further small lateral surface 18 parallel to surface 17 and facing radially inwards of wheel 10. As opposed to two packets 4, however, the whole of conveyor 9 may obviously be re-sized to transfer a single packet 4 laid flat.

Output conveyor 11 is defined by two superimposed conveyor belts 19 and 20 looped about respective pulleys 21 and 22. Belt 19 is located over belt 20, and both comprise respective superimposed conveying branches 23 facing each other, movable in a direction D2 substantially parallel to and aligned with direction D, and defining an output channel 24 for the succession of groups 2 of packets 4 positioned on edge, i.e. with small lateral surface 17 contacting the bottom branch 23, and with the longitudinal axis 4a of packets 4 crosswise to direction D2.

Transfer device 12 extends along a substantially horizontal axis 12a parallel to direction D, and comprises a single transfer member defined by a screw 25 rotated at substantially constant speed about axis 12a by a known motor (not shown). Screw 25 comprises a substantially bulb-shaped inner core 26 coaxial with axis 12a, and in turn comprising an input portion 27 and an output portion 28. Input portion 27 is defined externally by a surface 29, which, in the example shown, is a substantially truncated-cone-shaped step surface tapering towards input 7 and defined, at input 7, by a substantially circular flat surface 30 crosswise to axis 12a; and output portion 28 is defined externally by a substantially truncated-cone-shaped step surface 31 with the wider end adjacent to the wider end of surface 29, and the narrower end of which is defined by a substantially circular flat surface 32 crosswise to axis 12a.

In the example shown, screw 25 comprises N number of threads, each of which is defined by a rib 33 winding in a helix about core 26. More specifically, each rib 33 is maintained substantially perpendicular to axis 12a along output portion 28, whereas, along surface 29 from surface 30 towards surface 31, each rib 33 rotates with respect to axis 12a from a position substantially parallel, to a position perpendicular to axis 12a. Ribs 33 define, with core 26, respective outwardly-open channels 34 of a height approximately equal to but no less than the thickness of two packets 4 measured on conveyor 9 and parallel to the axis (not shown) of conveyor 9, and of a depth, measured radially with respect to core 26, less than the width of packets 4 measured on conveyor 9 and parallel to direction D1. Each channel 34 has a longitudinal axis 34a, which winds in a variable-pitch helix preferably but not necessarily decreasing in pitch along axis 12a in direction D, and substantially in a spiral along input and output portions 27 and 28 of core 26. As a result of the different positions assumed by each rib 33 with respect to core 26 along portions 27 and 28, each channel 34 winds substantially in a helix about output portion 28 of core 26, with its concavity maintained facing substantially radially outwards with respect to axis 12a, whereas, along input portion 27, each channel 34 winds in a helix about axis 12a and, at the same time, winds 90° about its own axis 34a, so as to be eventually positioned with its concavity parallel to axis 12a and facing the periphery of wheel 10.

Figure 3:
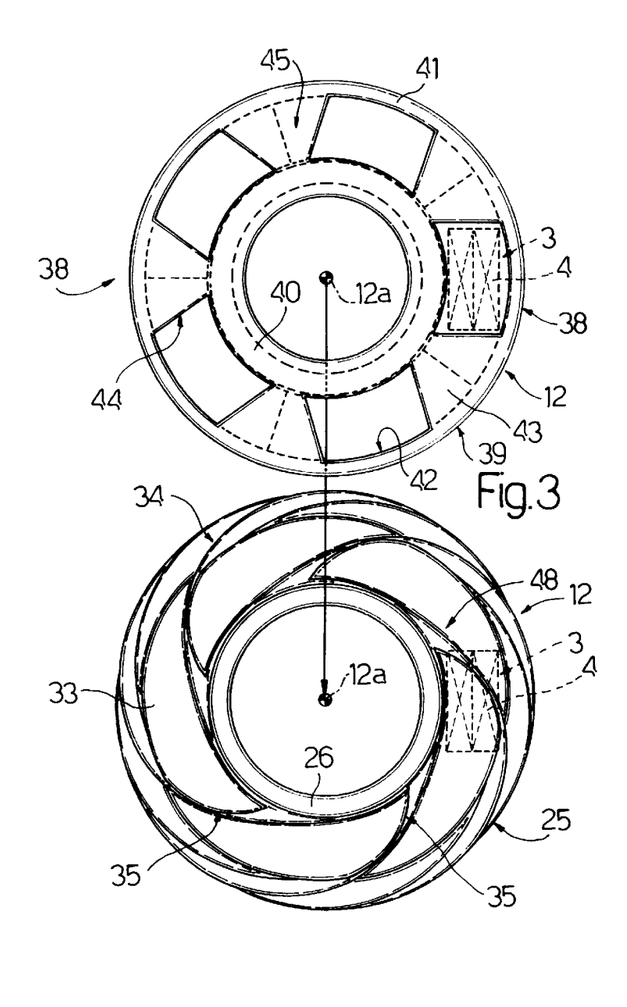
FIGS. 3 and 4 show, with parts removed for clarity, smaller-scale bottom and top plan views respectively of the FIG. 1 unit.
Figure 4:
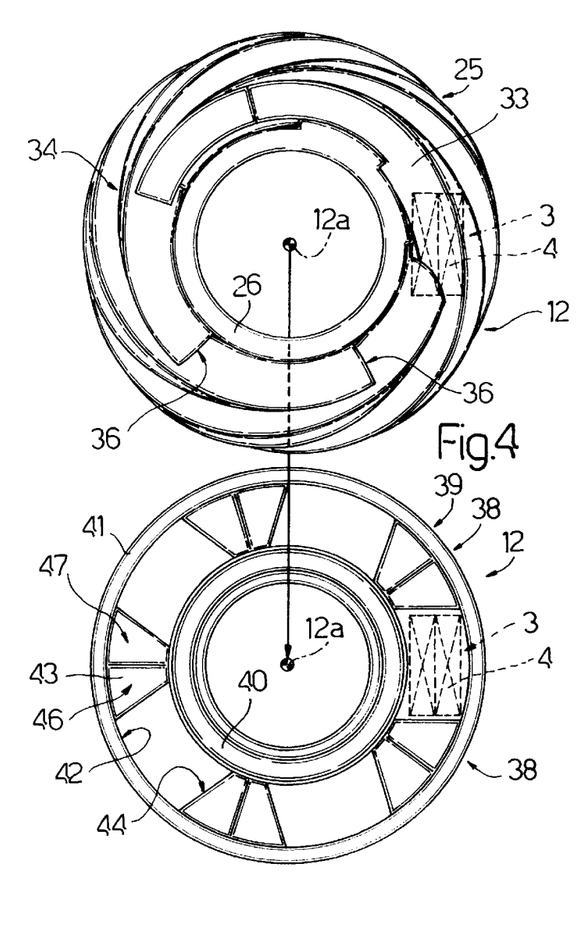

As shown in FIGS. 3 and 4, channels 34 comprise respective inlets 35 and respective outlets 36 defined respectively by the leading edges and by the trailing edges of respective ribs 33; inlets 35 are positioned facing wheel 10, are located substantially on flat surface 30, and are arranged angularly about axis 12a with a given angular pitch P1; and outlets 36 are positioned facing channel 24, are located substantially on flat surface 32, and are arranged angularly about axis 12a with a given angular pitch P2 smaller than pitch P1. As a result of the difference in pitch of inlets 35 and outlets 36, and the variation in the pitch of channels 34 about axis 12a, the packets 4 in each pair fed along path P are brought into contact, in use, with the adjacent pairs of packets 4 in the same group 2 at output 8, and the packets 4 in each group 2 are separated from the packets 4 in the adjacent groups 2 to form an orderly succession 6 of groups 2 along output conveyor 11.

A helical end portion 37 of one of ribs 33—in particular, the rib 33 for feeding the last product 3 in each group 2 along path P—projects from core 26 with respect to surface 32 so that it is substantially tangent to belts 19 and 20 at pulleys 21 and 22, and acts as an unloading means for unloading each group 2 off screw 25 and onto an input portion of belts 19 and 20.

In addition to screw 25, transfer device 12 also comprises a clamping device 38, which in turn comprises a wheel 39 coaxial with axis 12a, and cooperates with pushers 14 to insert each pair of packets 4 inside respective channel 34 at transfer station 15. Wheel 39 in turn comprises a cylindrical hub 40 fitted integrally to screw 25 and contacting surface 30 of core 26 of screw 25; a wheel rim 41 defining, with hub 40, an annular channel 42 coaxial with axis 12a and of a thickness equal to the thickness of wheel 39 measured along axis 12a; and N number of spokes 43 connecting hub 40 and rim 41, and equally spaced with pitch P1 about axis 12a and along channel 42.

Spokes 43 are of a thickness, measured along axis 12a, substantially smaller than the thickness of channel 42, and define respective openings 44 defined by respective annular sectors directly facing a respective inlet 35, and for permitting the passage of two respective packets 4 through wheel 39. More specifically, each spoke 43 is substantially triangular, and is defined, on the side facing wheel 10, by a flat surface 45 parallel to surface 30, and, on the side facing core 26, by a further flat surface 46 parallel to respective surface 45, and by a surface 47 inclined parallel to axis 34a of relative channel 34. Each surface 47 engages lateral surfaces 18 of the relative pair of packets 4 before these are released, in use, by relative pusher 14, and cooperates with the inner cylindrical surfaces of channel 42 and with surface 29 to clamp the two packets 4 against a bottom surface 48 of the rib 33 angularly preceding the relative rib 33.

Transfer device 12 also comprises a fixed guide 49 extending along path P and having an input 50 and an output portion 51 by which packets 4 are respectively fed into and out of guide 49. Input 50 is located between wheel 39 and core 26, and output portion 51 extends partly along portion 28 and partly along the input portion of belts 19 and 20.

Guide 49 comprises two shaped lateral bars 52 substantially tangent to the outer surface of screw 25, separated from surfaces 29 and 31 by a constant distance approximately equal to but no greater than the dimension of a packet 4 measured parallel to direction D1 on conveyor 9, and separated from each other by a distance approximately equal to but no smaller than the dimension of a packet 4 measured crosswise to direction D1 on conveyor 9. The two lateral bars 52 also comprise respective straight end portions 53 extending alongside and parallel to belts 19 and 20, and cooperating with belts 19 and 20 as groups 2 are fed, in use, to the cartoning machine.

Guide 49 also comprises a further two straight bars 54 parallel to and facing end portions 53 of guide 49, and which extend from surface 32 towards conveyor 11, and are coplanar with and located on either side of branch 23 of belt 20. Bars 54 are L-shaped in section to define a channel of a width approximately equal to but no smaller than the dimension of packet 4 measured parallel to axis 4a.

In actual use, conveyor 9 is timed with respect to screw 25 so as to feed two packets 4 through a respective opening 44 and through input 50 into each channel 34 at each passage of opening 44 through station 15 and, hence, each time respective inlet 35 travels past input 50. As the two packets 4 are pushed by respective pusher 14 through respective inlet 35 into respective channel 34 and onto the surface 48 of a preceding rib 33, the rotation of wheel 39 of clamping device 38 causes inclined surface 47 of respective spoke 43 to simultaneously engage the small lateral surfaces 18 of packets 4 to hold packets 4 substantially in contact with surface 48 and so prevent packets 4 from backing up when released by pusher 14.

As screw 25 rotates, packets 4 are engaged by relative rib 33, slide along rib 33, and are fed simultaneously along guide 49 and along respective channel 34 to output portion 51. Along portions 27 and 28 of core 26, packets 4 are rotated 90° about respective axes 4a so as to be eventually positioned on edge at output 8, whereas respective axes 4a move parallel to themselves from conveyor 9 to conveyor 11, so that, at output 8, each packet 4 is inserted on edge into respective group 2, and is fully supported by bars 54 in channel 24, with respective lateral surface 17 resting on bars 54.

At the same time packets 4 are rotated and fed along guide 49, the distance, measured along path P, between two adjacent pairs of packets 4 in the same group 2 is gradually reduced, so that, at output 8 of path P, the pairs of packets 4 are positioned side by side to form group 2. Moreover, as the pitch P2 of outlets 36 is smaller than the pitch P1 of inlets 35, the groups 2 between belts 19 and 20 are separated by a given distance proportional to the difference between the sum of pitches P1 and the sum of pitches P2.

Once formed at output 8, each group 2 is fed by end portion 37 between belts 19 and 20 at a supply speed comprising a component, parallel to axis 12a, equal to the traveling speed of belts 19 and 20.

In the FIGS. 1 and 2 example, guide 49 is coplanar with axis 12a, i.e. winds by an angle of zero degrees about axis 12a. Should guide 49, however, wind about axis 12a by an angle of, say, 90°, portion 51 of guide 49 would obviously be positioned in a vertical plane parallel to axis 12a. And by also positioning bars 54 in a vertical plane, it is possible to obtain on conveyor 11—also positioned with branches 23 in parallel vertical planes, and possibly associated with a further horizontal conveyor located beyond the end of screw 25—a succession 6 of groups 2 wherein packets 4 are not only positioned on edge, but also rotated 90° about an axis perpendicular to surface 16.

Figure 5:
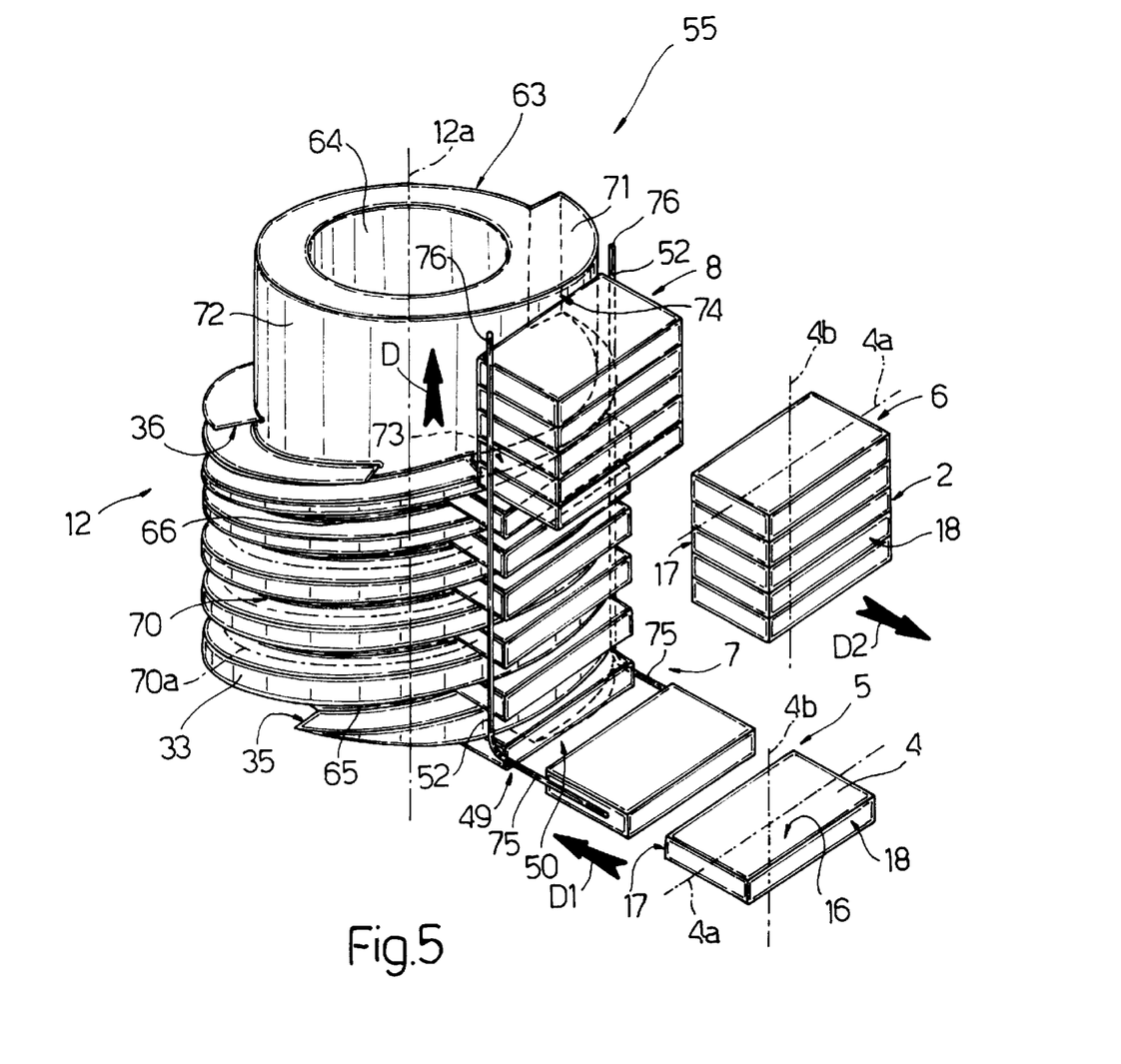
FIG. 5 shows a schematic view in perspective, with parts removed for clarity, of a second preferred embodiment of the forming unit according to the present invention.
Figure 6:
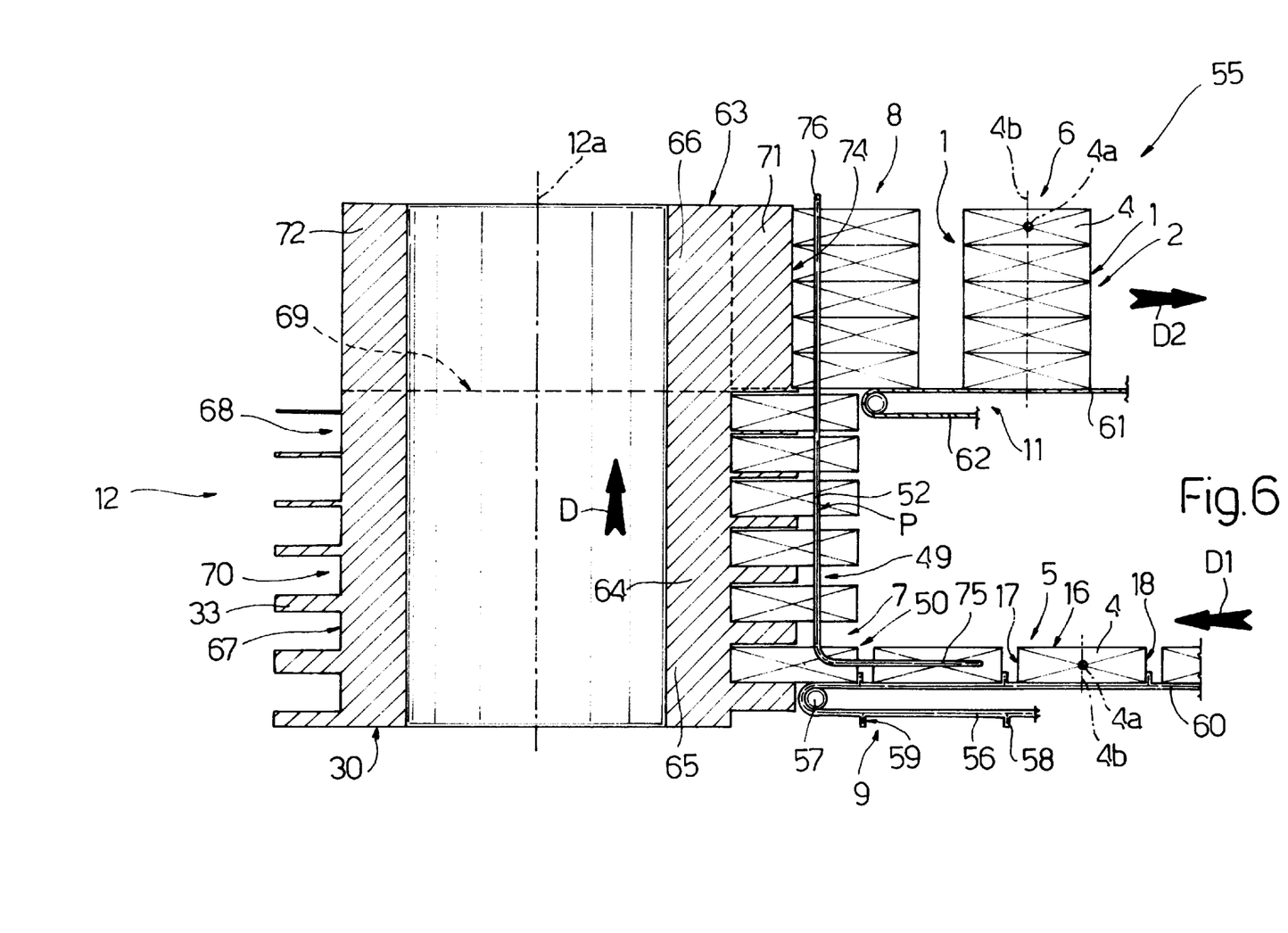
FIG. 6 shows a longitudinal section of the FIG. 5 unit.

The FIGS. 5 and 6 embodiment relates to a unit 55 for forming groups 2 comprising a given N number of products 3, which, in this case, comprise single packets 4 of cigarettes, and are laid flat one on top of the other in respective groups 2 to form a stack of packets 4.

In unit 55, input conveyor 9 comprises an output pocket conveyor of a known cellophaning machine (not shown); output conveyor 11 is located at a higher level than conveyor 9; and transfer device 12 imparts to packets 4 a movement comprising both a vertical component for transferring packets 4 from the level of conveyor 9 to the level of conveyor 11, and a 180° rotation about a respective transverse axis 4b lying in the FIG. 6 plane and crosswise to axis 4a.

Conveyor 9 of unit 55 comprises a belt 56 looped about two pulleys 57 (only one shown), one of which is a drive pulley for feeding belt 56 in steps or continuously; and belt 56 comprises a number of equally spaced outer projections 58 defining a succession of pockets 59, each for receiving a respective packet 4 positioned with axis 4b crosswise to direction D1, which, in this case, corresponds with the traveling direction of belt 56.

Each packet 4 is laid flat on belt 56, i.e. with large lateral surface 16 contacting a substantially horizontal upper conveying branch 60 of belt 56, and is fed in direction D1 with small lateral surface 17 facing forwards; whereas, when rotated 180° about respective axis 4b, and when forming part of respective group 2 inside a respective known conveying pocket (not shown) forming part of conveyor 11, packet 4 is subsequently fed by conveyor 11 in direction D2 with respective small lateral surface 18 facing forwards, and on a substantially horizontal conveying surface 61 defined by an upper conveying branch of a belt conveyor 62 traveling in steps or continuously at a speed equal, as explained later on, to the supply speed of transfer device 12.

Transfer device 12 of unit 55 extends along a substantially vertical axis 12a crosswise to directions D1 and D2, and comprises a single transfer member comprising a screw 63 rotated at substantially constant speed about axis 12a by a known motor (not shown). Screw 63 comprises an inner core 64 coaxial with axis 12a and in turn comprising a bottom input portion 65 and a top output portion 66. Input portion 65 is defined externally by a surface 67, which, in the example shown, is a substantially cylindrical surface defined at the bottom by surface 30; and output portion 66 is also defined externally by a substantially cylindrical surface 68, the bottom end of which is adjacent to the top end of surface 67, and the top end of which is defined by a plane 69 (shown by the dotted line in FIG. 6) crosswise to axis 12a and equivalent to output surface 32 of unit 1.

In the example shown, screw 63 comprises five threads, each defined by a rib 33 winding in a helix about core 64. More specifically, each rib 33 is maintained substantially perpendicular to axis 12a along bottom input portion 65 and along output portion 67; and ribs 33 define five outwardly-open channels 70 of a height approximately equal to but no smaller than the thickness of a packet 4 measured perpendicularly to respective surfaces 16, and of a depth less than the width of packet 4 measured parallel to surfaces 16. Each channel 70 has a longitudinal axis 70a winding, in the example shown, about axis 12a in a respective cylindrical helix of variable, preferably but not necessarily decreasing, pitch, and is maintained with its concavity facing substantially radially outwards with respect to axis 12a.

In unit 55, end portion 37 is replaced by a substantially wedge-shaped arc portion 71 extending gradually outwards from a cylindrical extension 72 of core 64 over plane 69. More specifically, the rib 33 for feeding the last packet 4 in each group 2 along path P comprises, as of outlet 36 of respective channel 70, an end surface 73 coplanar with surface 61; and portion 71 is defined laterally by an unloading surface 74, which, as of outlet 36 of respective channel 70, extends radially outwards of cylindrical extension 72 in a spiral gradually occupying surface 73 so as to act, once laterally engaging group 2, as an unloading means for unloading group 2 off screw 63 onto surface 61, and so as to move group 2 radially with respect to axis 12a and parallel to direction D2 at a supply speed equal to said traveling speed of conveyor 62.

Finally, lateral bars 52 of unit 55 are substantially L-shaped, and comprise respective initial portions 75 parallel to direction D1 and extending alongside conveying branch 60 of conveyor 9, and respective end portions 76 parallel to direction D and substantially tangent to the outer surface of screw 63. More specifically, conveyor 9 feeds packets 4 between initial portions 75 of bars 52 until packets 4 are engaged by a rib 33 and fed upwards in direction D between end portions 76.

Operation of unit 55 is clearly understandable from the foregoing description and from what has already been said relative to unit 1, and therefore requires no further explanation. It should be pointed out, however, that, whereas, in unit 55, guide 49 winds about screw 63 and axis 12a by an angle of zero degrees, and directions D1 and D2 are parallel to each other, guide 49 may obviously wind about axis 12a at any angle between 0° and 360°, so that directions D1 and D2 may form any angle between 0° and 180°. In other words, unit 55 provides for transferring a succession of packets 4 between two conveyors 9 and 11 at different levels and forming any angle between 0° and 180°, thus eliminating any problems as regards the layout of the system.

Figure 7:
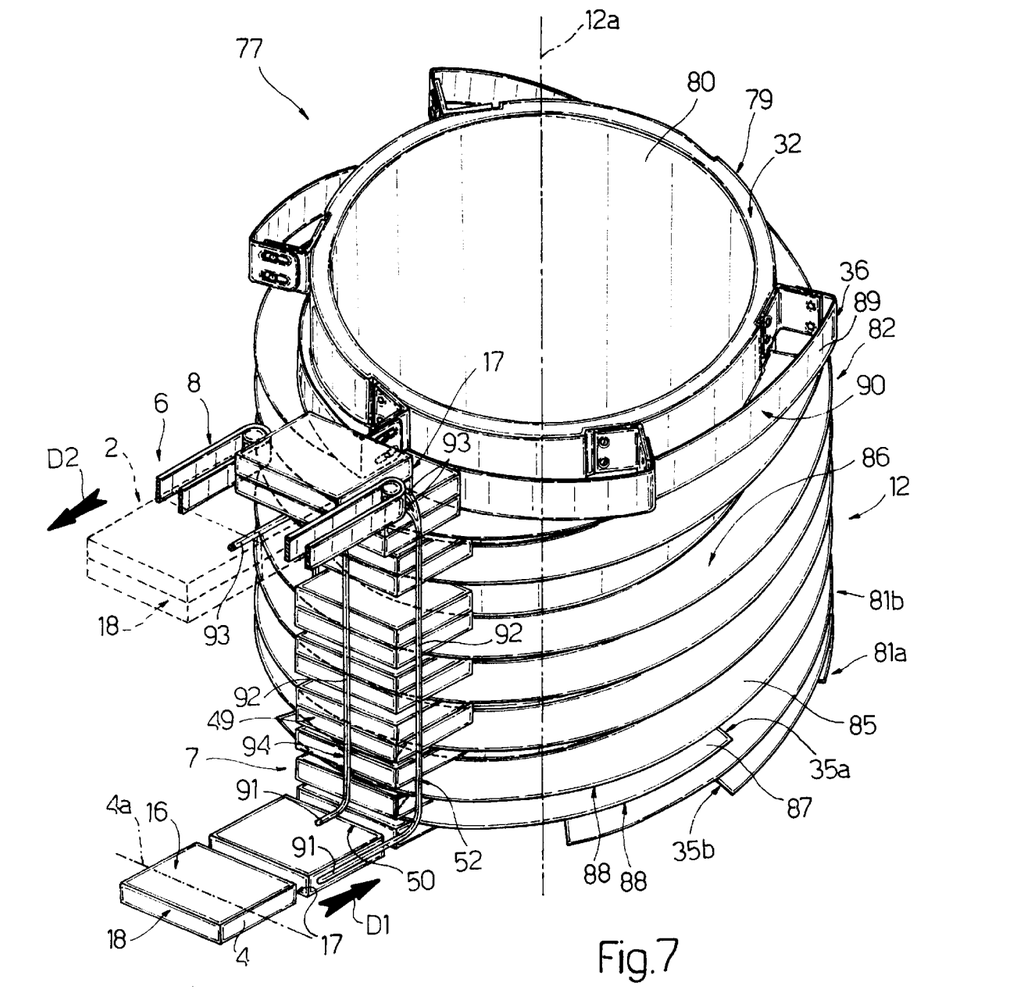
FIG. 7 shows a schematic view in perspective, with parts removed for clarity, of a third preferred embodiment of the forming unit according to the present invention.
Figure 8:
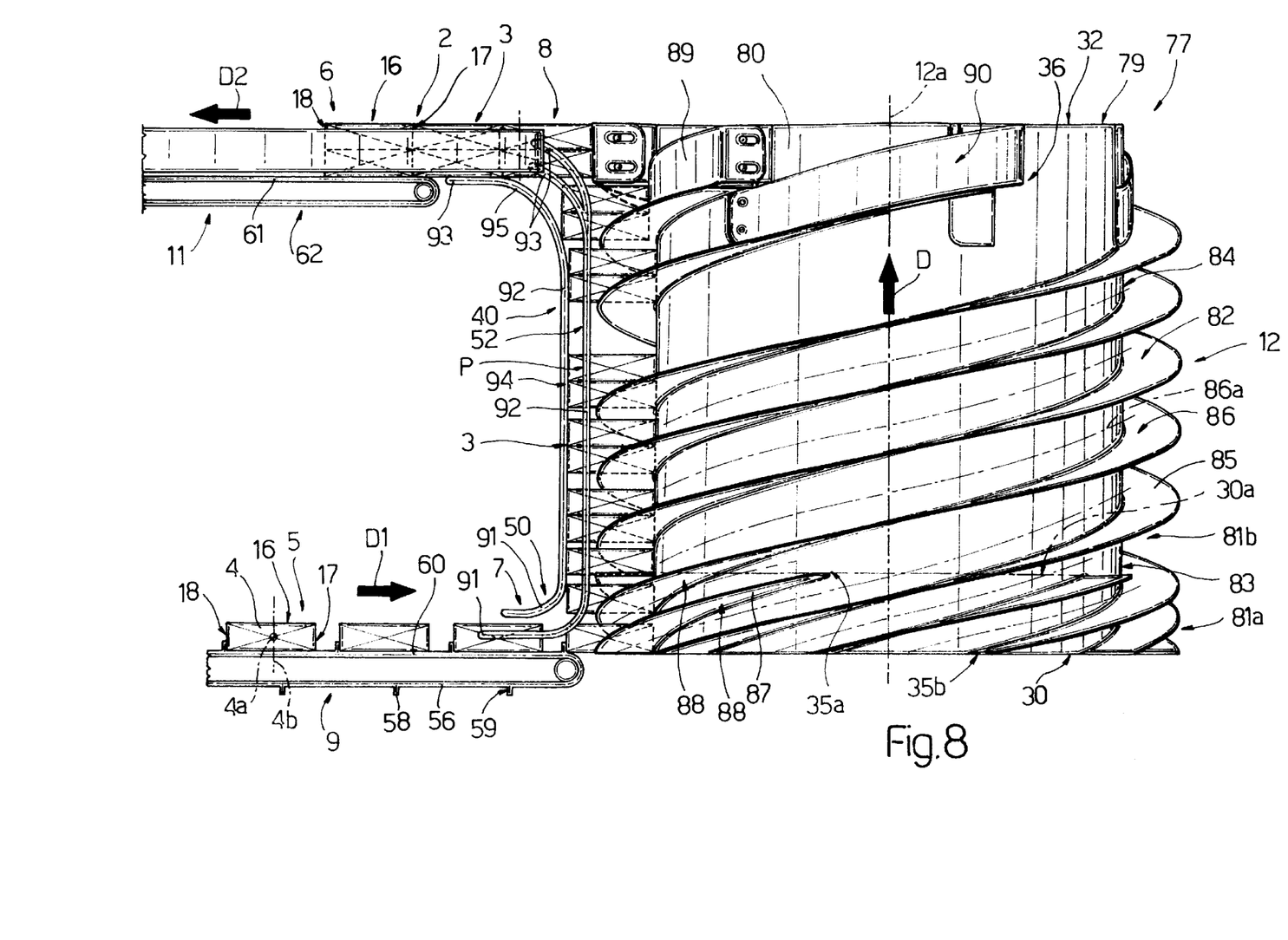
FIG. 8 shows a longitudinal section of the FIG. 7 unit.

The FIGS. 7 and 8 embodiment relates to a unit 77 for forming groups 2 comprising a given N number of products 3, each of which is defined by two packets 4 positioned one on top of the other, and is located side by side with another product 3 in respective group 2 so as to form a succession of side by side pairs of packets 4. More specifically, unit 77 receives a succession 5 of packets 4 from conveyor 9, and provides, firstly, for forming packets 4 into pairs to form products 3, and secondly, for forming products 3 into groups 2.

Transfer device 12 of unit 77 extends along a substantially vertical axis 12a crosswise to directions D1 and D2, and comprises a single transfer member comprising a screw 79 rotated at substantially constant speed about axis 12a by a known motor (not shown). Screw 79 comprises an inner core 80 coaxial with axis 12a and in turn comprising a bottom input portion 81 divided into a primary portion 81a and a secondary portion 81b, and a top output portion 82. Input portion 81 is defined externally by a surface 83, which, in the example shown, is a substantially cylindrical surface defined at the bottom by surface 30; and output portion 82 is also defined externally by a substantially cylindrical surface 84, the bottom end of which is adjacent to the top end of surface 83, and the top end of which is defined by surface 32.

In the example shown, portions 81 and 82 comprise five threads, each defined by a rib 85 winding in a helix about core 80. More specifically, ribs 85 are maintained substantially perpendicular to axis 12a along portion 81 and output portion 82, and define, with core 80, respective outwardly-open channels 86 of a height approximately equal to but no smaller than the thickness of two packets 4 measured on conveyor 9 and crosswise to surface 60 of conveyor 9, and of a depth, measured radially with respect to core 80, less than the width of packets 4 measured on conveyor 9 and parallel to direction D1. Channels 86 comprise respective secondary inlets 35a, which are equally spaced with pitch P1 on an intermediate plane 30a (shown by the dotted line in FIG. 8) located between portions 81a and 81b and coplanar with surface 30, and which are therefore located at a higher level than surface 60. Each channel 86 also has a longitudinal axis 86a winding, in the example shown, about axis 12a in a respective cylindrical helix of variable, preferably but not necessarily decreasing, pitch, and is maintained with its concavity facing substantially radially outwards with respect to axis 12a.

Portion 81a extends vertically upwards from surface 30 by a length substantially equal to the thickness of at least three packets 4, and comprises a further five threads defined by respective ribs 87, each of which extends from surface 30 in a substantially intermediate position between two ribs 85, and winds partially in a helix about core 80. More specifically, ribs 87 are maintained substantially perpendicular to axis 12a along bottom input portion 81, and each define, with core 80 and with the adjacent ribs 85, two respective outwardly-open channels 88 of a height approximately equal to but no smaller than the thickness of packet 4 measured on conveyor 9 and crosswise to surface 60 of conveyor 9, and of a depth, measured radially with respect to core 80, less than the width of packet 4 measured on conveyor 9 and parallel to direction D1. Ribs 87 terminate at secondary inlets 35a of channels 86, and each pair of channels 88 between two ribs 85 flows into a channel 86 to supply channel 86 with a product 3 defined by two packets 4 supplied to channels 88 by conveyor 9 at respective primary inlets 35b substantially on a level with surface 30.

In unit 77, each channel 86 comprises, at respective outlet 36, a respective curved plate 89 extending gradually outwards from core 80 and defined laterally by a respective unloading surface 90, which extends in a spiral gradually occupying respective rib 85 so as to act, once laterally engaging a product 3, as an unloading means for unloading product 3 off screw 79 onto surface 61 of conveyor 62, and so as to move product 3 radially with respect to axis 12a and parallel to direction D2 at a supply speed equal to said traveling speed of conveyor 62.

Finally, lateral bars 52 of unit 77 are substantially C-shaped, and comprise respective initial portions 91 parallel to direction D1 and extending alongside conveying branch 60 of conveyor 9; respective intermediate portions 92 parallel to direction D and substantially tangent to the outer surface of screw 79; and respective end portions 93 parallel to direction D2 and defined by respective belt conveyors located on either side of and crosswise to surface 61.

Guide 49 also comprises a central bar 94 located between and of substantially the same shape as bars 52, and wherein portion 91 extends over branch 60 at a height, with respect to branch 60, approximately equal to but no less than the thickness of a packet 4, portion 92 extends laterally with respect the outer surface of screw 79, at such a distance as to be engaged in sliding manner by surfaces 18 of packets 4, and portion 93 extends coplanar with surface 61. Portions 92 and 93 are connected by respective curved portions 95 for frontally guiding each product 3 as it is engaged by respective plate 89 and fed, in use, from respective rib 85 towards surface 61.

Operation of unit 77 is clearly understandable from what has already been said relative to unit 1 and unit 55, and therefore requires no further explanation. It should be pointed out, however, that, in unit 77, packets 4 are first compacted along portion 81a to form products 3, which are in turn compacted as they are fed in direction D along portions 81b and 82, and, on reaching output 8, are positioned one against the other on surface 61 by respective plates 89 to form group 2. As in unit 55, guide 49 of unit 77 may wind about screw 79 to eliminate any problems as regards the layout of the system.

What is claimed is:

1. In a unit (59) for forming groups (2) of products (3), each of said groups comprising a given number (N) of said products (3), the improvement of said unit (55) comprising:
   supply means (9) for feeding an orderly first succession (5) of said products (3); and
   a variable-pitch conveying means (12) for conveying said products (3) from said first succession (5) along a path (P) from an input (7) to an output (8) of said path (P), said supply means being adjacent to said input (7);

wherein said variable-pitch conveying means (12) comprise a single screw conveying member (63) for rotating continuously about a first axis (12a) and, for said products (3), a number of peripheral channels (70) equal in number to said given number (N) to feed at least one of said products (3) of each of said groups (2) respectively along said peripheral channels (70), said peripheral channels (70) having respective longitudinal second axes (70a), said longitudinal second axes (70a) winding substantially helically about said first axis (12a) with respective variable pitches;

guide means (49) extending along said path (P) and adjacent to said single screw conveying member (63) to guide said products (3) along said channels (70) as said single screw conveying member (63) rotates about said first axis (12a), so that, as said products (3) are fed along said path (P), said first succession (5) is converted into an orderly second succession (6) of said groups (2) of said products (3).

2. A unit as claimed in claim 1, characterized in that said input (7) and said output (8) of said conveying path (P) are located substantially at the same level.

3. A unit as claimed in claim 1, characterized in that said second portion (82) of said core (80) comprises, for each said channel (86), a substantially wedge-shaped arc portion (89) located at the end surface (32) of the second portion (82) and cooperating with said products (3) to extract the products 83) from the channel (86).

4. A unit as claimed in claim 2, characterized by comprising lead-in means (38) connected to said single screw conveying member (25; 63; 79) and rotating about said first axis (12a) together with the screw conveying member (25; 63; 79) to feed the packets (4) into each said channel (34; 70; 86).

5. A unit as claimed in claim 4, characterized in that said lead-in means (38) comprise a wheel (39) in turn comprising, for each said inlet (35) of each said channel (34), a spoke (43) extending from said first axis (12a) and having an inclined surface (47) facing the respective channel (34) and having the same inclination as said second axis (34a) of the channel (34) at the respective said inlet (35).

6. A unit as claimed in claim 1, characterized in that said core (26) comprises a first and a second portion (27, 28) extending along said conveying path (P), and is substantially bulb-shaped; each said rib (33) being maintained substantially crosswise to said first axis (12a) along said second portion (28), and rotating about said second axis (34a) between a position substantially crosswise to a portion substantially parallel to the first axis (12a) along said first portion (27).

7. A unit as claimed in claim 6, characterized in that said second portion of said core (26) comprises an end surface (32) crosswise to said first axis (12a); said second outlets (36) being arranged along said end surface (32).

8. A unit as claimed in claim 7, characterized in that an end portion (37) of one of said ribs (33) extends from said second portion (28) and beyond said end surface (32); said end portion (37) defining, for said screw conveying member (25), unloading means cooperating with said products (3) to extract the products (3) from the screw conveying member (25).

9. A unit as claimed in claim 1, wherein a first and last channel comprise a respective inlet (35) and a respective outlet (36); said inlets (35) and said outlets (36) being spaced angularly about said first axis (12a) with a given first and a given second pitch (P1, P2), respectively.

10. A unit as claimed in claim 9, wherein said single screw conveying member (63) comprises an inner core (64) coaxial with said first axis (12a) and in turn comprising a number of substantially helical threads (33) winding about said inner core (64) and equal in number to said given number (N); each thread (33) being defined by a respective substantially flat rib (33) winding helically about said core (64).

11. A unit as claimed in claim 10, wherein said guide means (49) are substantially tangent to said threads (33).

12. A unit as claimed in claim 11, wherein said core (64) comprises a first and a second portion (65, 66) extending along said conveying path (P), and is substantially cylindrical; each said rib (33) being maintained substantially crosswise to said first axis (12a) along said first and said second portion (65, 66).

13. A unit as claimed in claim 12, wherein said second portion (66) of said core (64) comprises at least one substantially wedge-shaped arc portion (71) located at the end surface (69) of the second portion (66) and cooperating with said products (3) to extract said products (3) from said channels (70).

14. A unit as claimed in claim 9, wherein said second pitch (P2) is smaller than said first pitch (P1).

15. A unit as claimed in claim 14, wherein said single screw conveying member (63) comprises an inner core (64) coaxial with said first axis (12a) and in turn comprising a number of substantially helical threads (33) winding about said inner core (64) and equal in number to said given number (N); each thread (33) being defined by a respective substantially flat rib (33) winding helically about said core (64).

16. A unit as claimed in claim 15, wherein said guide means (49) are substantially tangent to said threads (33).

17. A unit as claimed in claim 16, wherein said core (64) comprises a first and a second portion (65, 66) extending along said conveying path (P), and is substantially cylindrical; each said rib (33) being maintained substantially crosswise to said first axis (12a) along said first and said second portion (65, 66).

18. A unit as claimed in claim 17, wherein said second portion (66) of said core (64) comprises at least one substantially wedge-shaped arc portion (71) located at the end surface (69) of the second portion (66) and cooperating with said products (3) to extract said products (3) from said channels (70).

19. A unit for forming groups of products, each group (2) comprising a given number (N) of products (3), and the unit (55) comprising supply means (9) for feeding an orderly first succession (5) of products (3); and a variable-pitch conveying means (12) defining a given path (P), said conveying means (12) feeding the products (3) in the first succession (5) along said path (P) from an input (7) to an output (8) of said path (P); said supply means being adjacent to said input (7); wherein said variable pitch conveying means (12) comprise a single screw conveying member (63) rotating about a first vertical axis (12a) and comprises, for said products (3), a number of peripheral channels (70) equal in number to said given number (N); the conveying member (63) rotating continuously about said first axis (12a) to feed at least one of said products (3) of each group (2) along each channel (70); each channel (70) having a respective longitudinal second axis (70a), said longitudinal second axis (70a) winding substantially helically about the first axis (12a) with a respective variable pitch, said unit comprising guide means (49) extending along said conveying path (P) and adjacent to said channels (70) to guide said products (3)

along said channels (70) as the single screw conveying member (63) rotates, in use, about said first axis (12a), so that, as the products (3) are fed along said path (P); said first succession (5) being converted, in use, in an orderly second succession (6) of said groups (2) of products (3).

20. A unit for forming groups of products, each group (2) comprising a given number (N) of products (3), and the unit (55) comprises supply means (9) for feeding an orderly first succession (5) of products (3); a variable-pitch conveying means (12) defining a given path (P), said conveying means (12) feeding the products (3) in the first succession (5) along said path (P) form an input (7) to an output (8) of said path (P); and an output conveyor (11) for receiving said groups (2); said supply means being adjacent to said input (7) and said output conveyor (11) being adjacent to said output (8); wherein said variable pitch conveying means (12) comprises a single screw conveying member (63) rotating about a first vertical axis (12a) and comprises, for said products (3), a number of peripheral channels (70) equal in number to said given number (N); the conveying member (63) rotating continuously about said first axis (12a) to feed at least one product (3) of each group (2) along each channel (70); each channel (70) having a respective longitudinal second axis (70a), said longitudinal second axis (70a) winding substantially helically about the first axis (12a) with a respective variable pitch; said unit comprising guide means (49) extending along said conveying path (P) and adjacent to said channels (70) to guide said products (3) along said channels (70) as the single screw conveying member (63) rotates, in use, about said first axis (12a), so that, as the products (3) are fed along said path (P); said first succession (5) being converted, in use, into an orderly second succession (6) of said groups (2) of products (3); said single screw conveying member (63) comprising a wedge-shaped arc portion (71) adjacent to said output for pushing said groups (2) onto said output conveyor (11).

* * * * *